May 5, 1925.

F. W. BERNAU 1,536,757

ADDING ACCUMULATOR

Filed Oct. 24, 1921

Inventor,
Frederick W. Bernau
By

May 5, 1925. 1,536,757
F. W. BERNAU
ADDING ACCUMULATOR
Filed Oct. 24, 1921     5 Sheets-Sheet 2

Inventor;
Frederick W. Bernau
By Geo. R. Shanlie
Atty.

May 5, 1925.

F. W. BERNAU 1,536,757

ADDING ACCUMULATOR

Filed Oct. 24, 1921

Inventor,
Frederick W. Bernau
By ... Atty.

May 5, 1925.
F. W. BERNAU
ADDING ACCUMULATOR
Filed Oct. 24, 1921
1,536,757
5 Sheets-Sheet 5
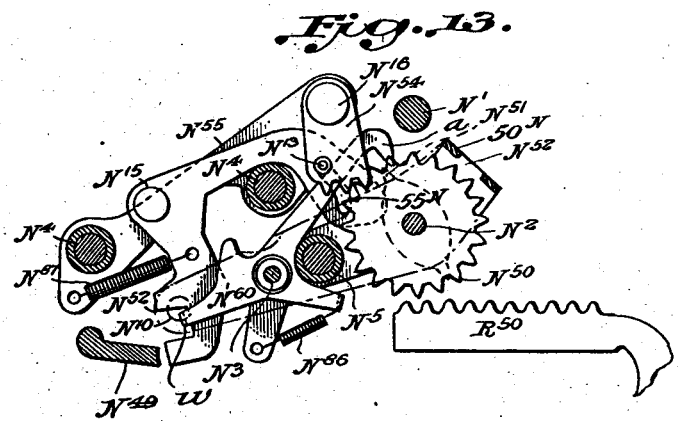
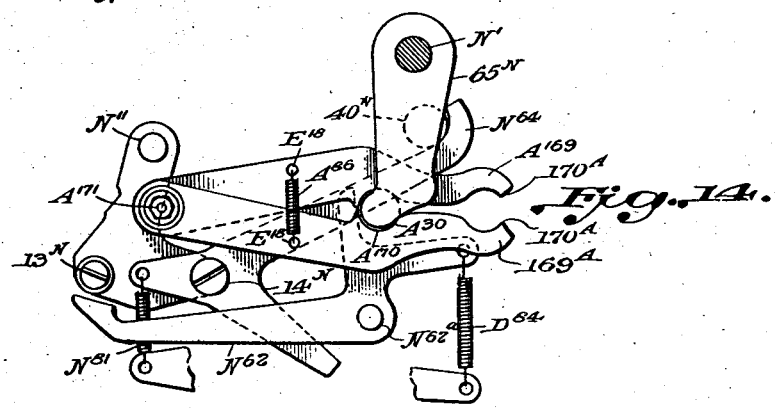
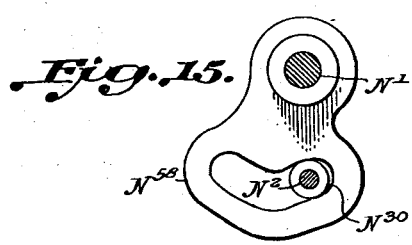 
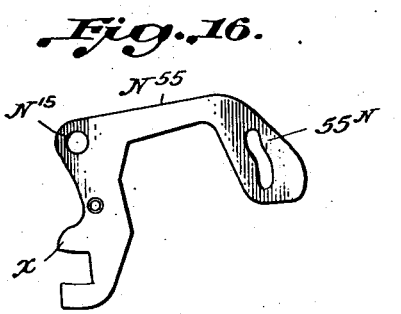 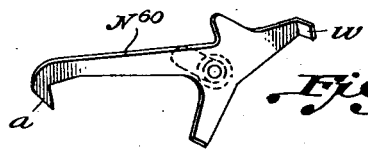

Patented May 5, 1925.

1,536,757

UNITED STATES PATENT OFFICE.

FREDERICK W. BERNAU, OF NEWARK, NEW JERSEY, ASSIGNOR TO ELLIS ADDING-TYPEWRITER COMPANY, OF NEWARK, NEW JERSEY, A CORPORATION OF NEW JERSEY.

ADDING ACCUMULATOR.

Application filed October 24, 1921. Serial No. 510,029.

*To all whom it may concern:*

Be it known that I, FREDERICK W. BERNAU, a citizen of the United States, residing at Newark, in the county of Essex and State of New Jersey, have invented certain new and useful Improvements in Adding Accumulators, of which the following is a specification.

The patent to Halcolm Ellis, No. 1,197,276, dated September 5, 1916, discloses accumulators which are adapted for carrying on adding operations. Ellis Patent No. 1,203,863, dated November 7, 1916, discloses accumulators embodying certain new and useful improvements over the accumulators of the Ellis Patent No. 1,197,276 whereby the same accumulator is adapted for carrying on either addition or subtraction.

The peculiarity of the improved construction of the combined adding and subtracting accumulator of the Ellis Patent No. 1,203,863 does not permit of the conversion thereof, by mere omission of the subtracting mechanism, into an accumulator which will be adapted for addition alone and yet the mechanism employed in that accumulator is so efficient that it is desirable to convert it into an accumulator adapted only for addition.

I have found that the mere omission of the subtracting cam $N^{56}$, the subtracting hook $N^{61}$, and the selective bar $N^{90}$ of the Ellis Patent No. 1,203,863 will not convert the accumulator into one which is adapted for addition only but I have discovered that by omitting the aforesaid parts and by changing the shape of the cam slot in the adding cam $N^{55}$ so that the enlarged head of said slot will be dispensed with, so much of the accumulator as pertains to effecting addition may be retained, after omitting those elements having to do with subtraction, and I thereby convert the accumulator into one which is adapted for addition only.

It is, therefore, the object of the present invention to convert the accumulator of the Ellis Patent No. 1,203,863 into a straight adding accumulator without having to modify the mechanism other than change the slot in the adding cam which controls the "carrying" detent, thus retaining all of the advantages inhering in the improved Ellis accumulator, without necessitating expensive changes which would increase manufacturing costs.

The present invention also embodies improvements in the mechanism for operating the carrying bar.

The invention being an improvement on the accumulator of the Ellis Patent No. 1,203,863 and a number of the parts comprising the mechanism being duplicates of corresponding parts of the adding mechanism of the said patented Ellis construction, reference is to be had to Patent No. 1,203,863 in connection with the present drawings and following description, and for this reason only the improved accumulator and its operating means are shown and set forth herein.

In the accompanying drawings:

Fig. 13 is a view like Fig. 1, the adding wheel having disengaged the rack and engaged the carrying detent and the carrying bar having returned to normal position, the operation of carrying having been effected by the movement of the adding cam.

Fig. 14 is a view like Fig. 2 showing the carrying bar operating parts back in their normal position corresponding to the position of the carrying bar in Fig. 13.

Fig. 15 is a view like Fig. 3 representing the position of the operating cam when the parts are as in the condition shown in Fig. 13.

Fig. 16 is a detail view of the adding cam showing the improved form of slot adapting said cam to be used for the purpose of effecting carrying in the adding mechanism.

Fig. 17 is a detail view of the adding hook shown in reversed position from its arrangement in the preceding figures, to illustrate its construction; and Fig. 18 is a detail view of the carrying detent or toothed segment.

Figure 1:
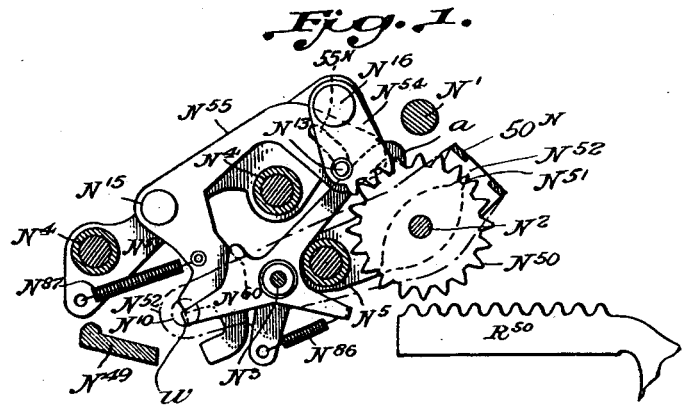
Figure 1 is a left side elevation showing in detail one set of mechanisms of the improved adding accumulator, and a portion of the corresponding rack, the parts being in normal position.

It will be understood that the drawings disclose the mechanism for only one numerical order and that there are as many racks, adding wheels or pinions, and adding mechanisms as there are numerical orders provided for by the machine. However, it will be understood that the carrying bar co-operates with all of the carrying mechanisms of the machine as may be arranged for carrying and that only one mechanism is used for the control of the carrying bar and that a pair of operating cams are used for controlling the engagement of the adding wheels with the racks and their disengagement therefrom.

In the same machine I may employ one or more accumulators adapted for addition alone, according to the present invention, or, in addition to one or more accumulators constructed and operating according to the present invention, there may be provided in the machine one or more combined adding and subtracting accumulators such, for instance, as set forth in the Ellis Patent No. 1,203,863.

A portion of one of the racks appears at $R^{50}$.

The adding wheels $N^{50}$ are mounted on a horizontal shaft $N^2$ which extends through plates $N^{52}$ connected by a cross brace $50^N$. The frame thus provided is pivoted at $N^{10}$ so that as said frame is swung downwardly or upwardly, adding wheels $N^{50}$ will be engaged with the racks $R^{50}$ or disengaged therefrom. Each adding wheel is provided with a two-pointed carrying cam $N^{51}$.

Mounted in the frame $N^{52}$ which carries the adding wheels and upon a shaft $N^3$ are a series of adding hooks $N^{60}$ which are shown in detail in Fig. 17, of which there is one for each adding wheel. Each adding hook has a point $a$ adapted to be engaged by either end of the two-point cam $N^{51}$ at the proper time. The adding hook also has a lug $w$ whose purpose will appear presently. The adding hook is operated by a spring $N^{86}$ which tends to cause the point $a$ to move toward the center of cam $N^{51}$. The shape of the point of the hook $N^{60}$ is such that in rotating the cam $N^{51}$ in a direction so that it strikes the point of the hook $N^{60}$ while moving toward the shaft $N^3$, the hook $N^{60}$ will rise up and the point of the cam $N^{51}$ will pass underneath it. On the other hand, if the rotation of the cam $N^{51}$ is in the reverse direction so that it engages the hook $N^{60}$ in a direction moving from the shaft $N^3$, the cam $N^{51}$ will stop against the inside of the hook $N^{60}$.

The hook $N^{60}$ serves as a latch to normally retain the adding cam $N^{55}$ in latched position but when the hook $N^{60}$ is tripped by the engagement of the cam $N^{51}$ therewith as above explained, the adding cam $N^{55}$ is released and effects carrying, as will be presently described.

There are a number of parallel plates $N^{53}$ separated by suitable collars and readily connected together in a group by rods $N^4$.

Adding cam plates $N^{55}$ (Fig. 16) are pivoted at $N^{15}$ to the plates $N^{53}$ and are provided with notched parts $x$ which are adapted to be engaged by the lugs or lips $w$ of the adding hooks $N^{60}$ under normal conditions. The notches of the adding cams $N^{55}$ receive the lips or lugs $w$ of the adding hooks $N^{60}$ when either point of the cam $N^{51}$ engages the hook $a$ and elevates it as, in that event, the lower end of the adding hook $N^{60}$ is depressed and the adding cam plate $N^{55}$ is unlatched. For each adding cam plate $N^{55}$ there is provided a spring $N^{87}$ which is connected to one of the plates $N^{53}$ and tends to rotate the adding cam plate so that its upper end moves in a downward direction in opposition to the latched up position in which said plate is normally retained by the hook $N^{60}$.

In the Ellis Patent No. 1,203,863 the adding cam plate $N^{55}$ is provided with a cam slot which has a head, as shown in Fig. 35 of the said patent, such enlargement or head of the slot being provided by reason of the combination with the adding cam plate $N^{56}$ of the subtracting cam plate $N^{56}$ of that patent.

Merely omitting the subtracting cam plate $N^{56}$ and its corresponding subtracting hook $N^{61}$ of the Ellis Patent No. 1,203,863 and dispensing with the blocking or shift bar $N^{90}$ will not convert the accumulator of that patent into a straight adding accumulator.

I have discovered that in addition to omitting the bar $N^{90}$, the subtracting cam plate $N^{56}$ and the subtracting hook $N^{61}$ of Patent No. 1,203,863, by changing the cam slot in the adding cam plate $N^{55}$ so that it is of general compound curve shape without an enlargement or head, the accumulator can be converted into a straight adding accumulator. I have provided a cam slot $55^N$ which is of general compound curve formation and whose margins are parallel throughout, except at the ends.

The pin $N^{13}$ of the toothed detent segment $N^{54}$ projects into the cam slot $55^N$ and thus the detent segment $N^{54}$, which is pivoted to the plate $N^{53}$ at $N^{16}$, is controlled solely by the position and movement of the adding cam plate $N^{55}$ and is adapted only to swing in one direction when engaged with the pinion or adding wheel $N^{50}$ instead of being adapted to swing in either direction when thus engaged, according to the control thereof by both adding and subtracting cam plates as in the Ellis Patent No. 1,203,863. The detent $N^{54}$ is under the absolute control of the adding cam plate $N^{55}$ due to the shape of the cam slot $55^N$. When the cam plate $N^{55}$ is restored to normal position, the detent $N^{54}$ is compelled to swing to the right in the various figures of the drawings. When the cam plate $N^{55}$ is unlatched by the disengagement of the adding hook $N^{60}$ therefrom, the spring $N^{87}$ instantly acts and when the cam plate is free to move under the action of said spring, the detent segment $N^{54}$ necessarily is compelled to swing to the left on its pivot $N^{16}$ and as this action occurs when said detent is engaged with the adding wheel $N^{50}$, carrying is thereby effected.

The carrying bar $N^{49}$ is adapted to cooperate with all of the adding cam plates $N^{55}$ to re-latch them and it is provided with upwardly extending arms at its ends which are pivoted at $N^{11}$ to the side frames of the machine (not shown). The carrying bar $N^{49}$ is normally held in its retracted position as shown in Fig. 1 by suitable springs.

The raising and lowering of the frame $N^{52}$ and the wheels $N^{50}$, and the operation of the carrying bar $N^{49}$ are similar to the operation of the corresponding mechanisms in the Ellis Patent No. 1,203,863. The means for raising and lowering the frame $N^{52}$ is identical with the means used for that purpose in the Ellis Patent No. 1,203,863. The mechanism for operating the carrying bar $N^{49}$ is somewhat modified over the corresponding mechanism of the Ellis patent aforesaid but serves the same purpose.

A shaft $N^1$ which is rocked by the same mechanism used in the Ellis patent, carries cams $N^{58}$ of which one is shown. These cams have slots which receive rollers $N^{30}$ on the ends of the shaft $N^2$ that carries the adding wheels $N^{50}$ and, as explained in the aforesaid Ellis patent, the cams $N^{58}$ determine the upward and downward movements of the frame $N^{52}$ to cause the wheels $N^{50}$ to either engage the detents $N^{54}$ or the racks $R^{50}$, according to conditions.

Figure 2:
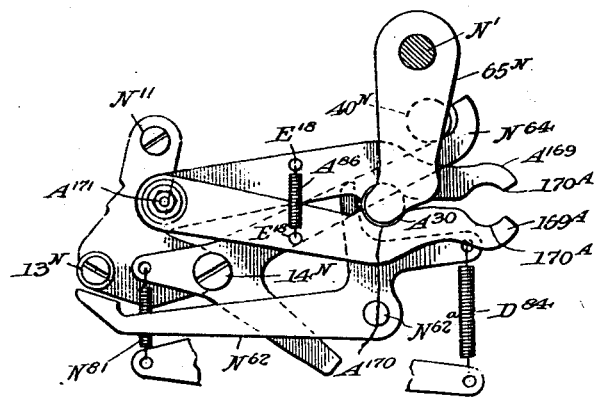
Fig. 2 is a similar view of the carrying bar operating mechanism arranged as it appears when the accumulator is in the position shown in Fig. 1.
Figure 8:
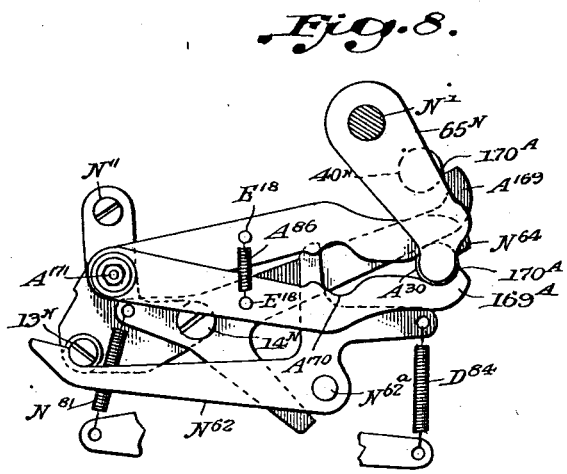
Fig. 8 is a view like Fig. 2 showing the parts in the position corresponding to the condition represented in Fig. 7.
Figure 11:
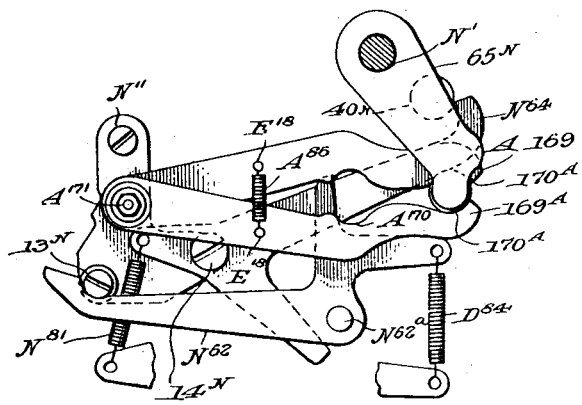
Fig. 11 is a view like Fig. 2 showing the position of the parts corresponding to the condition represented in Fig. 10.
Figure 12:
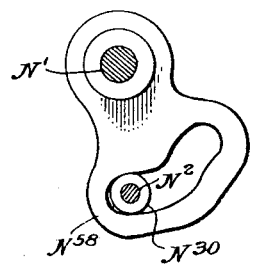
Fig. 12 is a view like Fig. 3 showing the position of the operating cam when the parts are as shown in Fig. 10.

A rocker arm $65^N$ which is carried by the shaft $N^1$ and has an antifriction roller $A^{30}$ on its end, is latched in either the position shown in Figs 2 and 14, which is the normal position, or in the position shown in Figs. 8 and 11, which is the abnormal position, by a scissors-like latching device comprising pieces $A^{169}$ and $169^A$ which are provided with suitable notches $A^{170}$ and $170^A$ to receive and hold the roller $A^{30}$ in the normal and abnormal positions assumed by the rocker $65^N$. The pieces $A^{169}$ and $169^A$ are pivoted to the frame or side plate of the machine at $A^{171}$ and they are drawn together by a spring $A^{86}$. This arrangement securely holds the arm $65^N$ in its forward and rearward position without requiring any releasing mechanism to spread the parts $A^{169}$, $169^A$, when the shaft $N^1$ is turned.

Pivoted at $14^N$ to the side plates of the carrying bar $N^{49}$ is a piece $N^{64}$ which has a hooked extremity that is made to cooperate with a pin or roller $40^N$ on the arm $65^N$ by the action of a spring $N^{81}$.

A hook $N^{62}$ which is suitably pivoted to the frame, is adapted to engage the roller or pin $13^N$ when the bar $N^{49}$ moves forwardly, there being provided a spring $D^{84}$ to actuate the hook $N^{62}$ for that purpose. The hook is suitably pivoted at $N^{62a}$ and is provided with an upwardly extending part or horn which is adapted to be engaged by the roller $A^{30}$ when the arm $65^N$ is in normal position as shown in Fig. 2, which results in the release of the roller $13^N$ so that the spring (not shown) which holds the carrying bar $N^{49}$ in normal position may act to restore it to that position.

Figure 5:
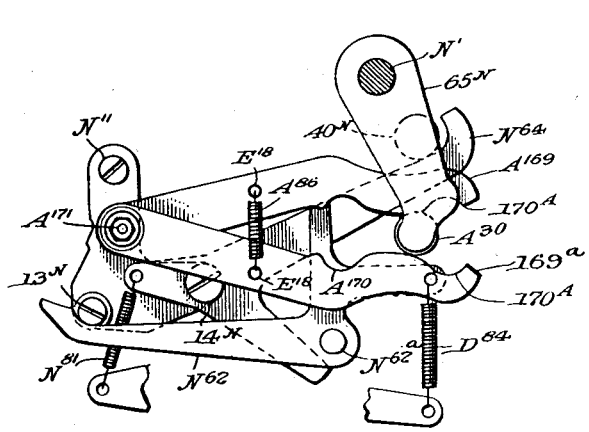
Fig. 5 is a view like Fig. 2 but representing the position of the carrying bar operating means when the accumulator is in the condition shown in Fig. 4.

When the arm $65^N$ moves forwardly as shown in Figs. 5, 8 and 11, the spring $D^{84}$ causes the hook $N^{62}$ to engage the roller $13^N$ and latch the carrying bar $N^{49}$ in its advanced position.

Figure 3:
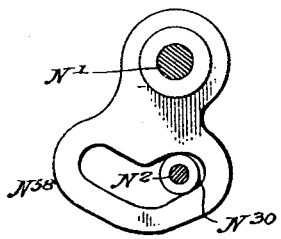
Fig. 3 is a detail elevation of the cam which causes the accumulator wheels or pinions to engage and disengage the racks, the parts being arranged to correspond with the condition represented in Fig. 1.
Figure 4:
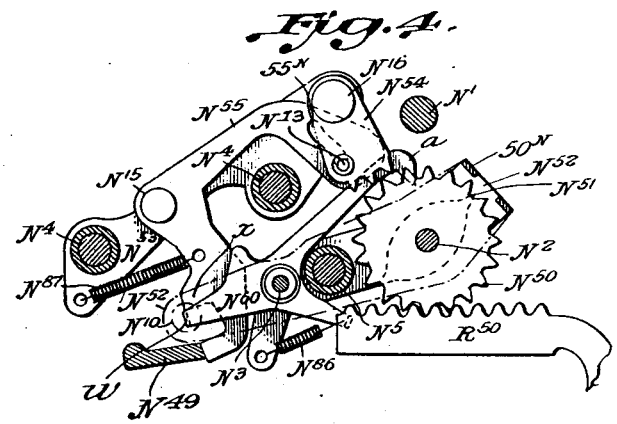
Fig. 4 is a view like Fig. 1 but showing the adding wheel or pinion in mesh with the rack and the carrying bar at its extreme forward position and about ready to disengage the adding cams of the accumulator.
Figure 6:
Fig. 6 is a view like Fig. 3 showing the position of the operating cam which corresponds to the condition shown in Fig. 4.
Figure 6:
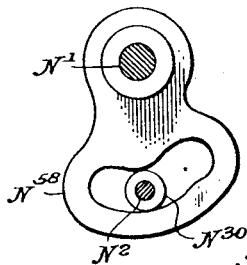
Figure 7:
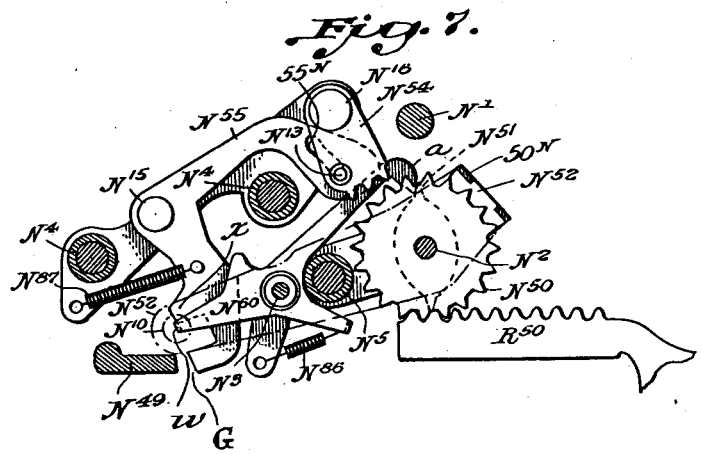
Fig. 7 is a view like Fig. 1 showing the two-pointed carrying cam on the pinion just coming into contact with the adding hook, the carrying bar being slightly withdrawn.
Figure 9:
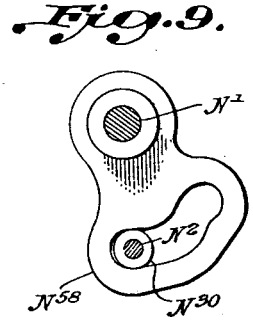
Fig. 9 is a view like Fig. 3 showing the position of the operating cam when the parts are in the position shown in Fig. 7.

The normal position of the mechanism is as shown in Figs. 1, 2 and 3, the adding wheels $N^{50}$ being then disengaged from the racks $R^{50}$ and engaged with the detent segments $N^{54}$. When the machine is operated the parts first assume the position shown in Figs. 4, 5 and 6. The cam $N^{58}$ has now caused the wheels N⁶⁰ to engage the racks R⁵⁰ and the turning of the shaft N¹ has resulted in the roller 40ᴺ pulling the piece N⁶⁴, thereby drawing the carrying bar N⁴⁹ forwardly until it engages the adding cams N⁵⁵. In the extreme forward position, the bar N⁴⁹ restores to latched position any cam plates N⁵⁵ which have been previously unlatched so that they are held by the hooks N⁶⁰. The final forward movement of the operating means of the machine brings the mechanisms to the position shown in Figs 7, 8 and 9 but the shape of the slot in the cams N⁵⁵ is such that there is no change in the position of the shaft N² in relation to the shaft N¹. The carrying bar N⁴⁹ drops back, leaving the gap G but is retained by the hook N⁶² as shown in Figs 7 and 8.

Figure 10:
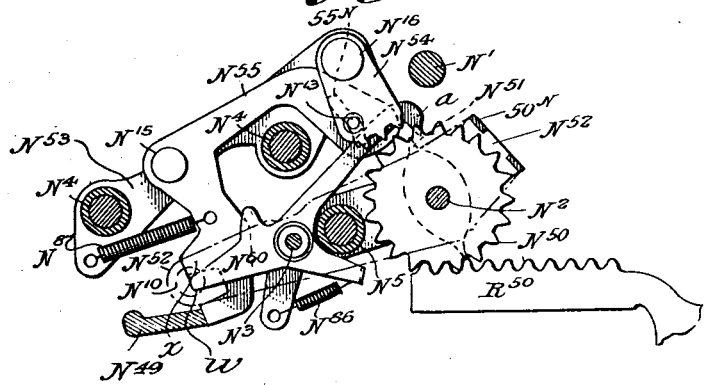
Fig. 10 is a view like Fig. 1, the two pointed carrying cam on the pinion having operated and passed the hook and disengaged the latter from the adding cam.

The return of the racks R⁵⁰ to their normal position causes the wheels N⁶⁰ to be turned correspondingly and during this operation if the two-point cam N⁶¹ engages and passes the point $a$ of the hook N⁶⁰, the lug $w$ is disengaged from the adding cam N⁵⁵ whereupon said cam drops back and engages the carrying bar N⁴⁹ which operation is shown in Fig. 10. At this time the carrying bar N⁴⁹ is still latched in its forward position by the roller 13ᴺ. The completion of the cycle of operations of the machine causes the shaft N¹ to be rocked backwardly toward the normal position shown in Figs 2 and 3. This results in the cam N⁵⁵ raising the frame N⁶² and bringing the wheels N⁶⁰ into mesh with the detent segments N⁵⁴. The action also results in the roller A³⁰ engaging the horn on the hook N⁶² thereby disengaging said hook from the roller 13ᴺ. The carrying bar N⁴⁹ now being free, its spring (not shown) snaps it to position shown in Figs 13 and 14. Inasmuch as the adding hook N⁶⁰ has been released from the carrying cam N⁵⁵ by the turning of the cam N⁶¹ (assuming that the wheels are in condition to effect carrying), the cam N⁵⁵ snaps back under the action of its spring N⁸⁷ and the detent segment N⁵⁴ turns the adding wheel N⁶⁰ of a higher order a distance of one tooth, thus effecting carrying.

On the next advance of the carrying bar N⁴⁹ the adding cam N⁵⁵ is engaged thereby and becomes re-latched by the action of spring N⁸⁶ on the latching hook N⁶⁰.

I claim:

1. In an adding accumulator, the combination with a movable actuator, of an accumulator wheel normally disengaged from the actuator and adapted for engagement therewith, and "carrying" mechanism for said accumulator wheel comprising a movably mounted detent adapted to engage the accumulator wheel when said wheel is free of its actuator and to become disengaged from the accumulator wheel when the latter is engaged by its actuator, and a shifting member having an operative connection to the detent, adapting said member to positively move the detent in one direction to effect "carrying" in the accumulator wheel and to positively move it in the opposite direction to restore said detent to normal position and to retain it in that position.

2. In an adding accumulator, the combination with a movable actuator, of an accumulator wheel normally disengaged from the actuator and adapted for engagement therewith, and "carrying" mechanism for said accumulator wheel comprising a movably mounted detent adapted to engage the accumulator wheel when said wheel is free of its actuator and to become disengaged from the accumulator wheel when the latter is engaged by its actuator, and a movably mounted shifting member having a slot provided with parallel walls extending from one end of the slot to its other end, the detent being provided with a pin which is received in said slot, said pin and slot connection adapting said shifting member to positively move the detent in one direction to effect "carrying" in the accumulator wheel and to positively move it in the opposite direction to restore said detent to normal position.

3. In an adding accumulator, the combination with a movable actuator, of an accumulator wheel normally disengaged from the actuator and adapted for engagement therewith, and "carrying" mechanism for said accumulator wheel comprising a pivoted swinging detent adapted to engage the accumulator wheel when said wheel is free of its actuator and to become disengaged from the accumulator wheel when the latter is engaged by its actuator, and a pivoted shifting member provided with a compound curved slot having parallel walls extending from one end of the slot to its other end, the detent being provided with a pin received in said slot, said pin and slot connection adapting said shifting member to positively move the detent in one direction to effect "carrying" in the accumulator wheel and to positively move it in the opposite direction to restore said detent to normal position, a spring for actuating the shifting member to move the detent to effect "carrying", and a spring actuated latching trip member for holding the shifting member in latched condition, said latching trip member being adapted for release by an accumulator wheel of a lower order.

4. In an adding accumulator, the combination with a movable actuator, of an accumulator wheel normally disengaged from the actuator and adapted for engagement therewith, and "carrying" mechanism for said accumulator wheel comprising a pivoted swinging detent adapted to engage the accumulator wheel when said wheel is free of its actuator and to become disengaged from the accumulator wheel when the latter is engaged by its actuator, and a pivoted shifting member provided with a compound curved slot having parallel walls, the detent being provided with a pin received in said slot, said pin and slot connection adapting said shifting member to positively move the detent in one direction to effect "carrying" in the accumulator wheel and to positively move it in the opposite direction to restore said detent to normal position.

In testimony whereof I affix my signature.

FREDERICK W. BERNAU.